Patented Nov. 6, 1934

1,979,385

UNITED STATES PATENT OFFICE

1,979,385

COSMETIC PREPARATION

Norman D. Harvey, Jr., Providence, R. I., assignor to Carbide and Carbon Chemicals Corporation, a corporation of New York No Drawing. Application November 10, 1931, Serial No. 574,231

5 Claims. (Cl. 167—91)

This invention deals with emulsified creams and preparations intended for use as cosmetics.

In the preparation of cosmetic creams and the like it is essential to select ingredients which are non-irritating to the human skin, and to blend these ingredients into a composition which is capable of performing the desired cosmeticol-therapeutic function. In general, emulsified creams are the most satisfactory for this purpose. Emulsified cosmetic creams are customarily prepared with sodium or potassium soaps as the emulsifying agents, and with glycerol as a softening material. The sodium or potassium soaps may hydrolyze under certain conditions and upon hydrolysis may produce sufficient alkalinity to be irritating to human skin: also, glycerol may produce undesirable stickiness and irritation under certain conditions.

The object of my invention is to overcome the above named difficulties, and to produce cosmetic preparations having new and advantageous properties. My invention has as its principal feature of novelty, the combination of a non-irritating emulsifying agent with a novel type of softening material, all as more fully hereinafter described.

The ethanolamines in combination with various fatty acids form excellent emulsifying agents. These emulsifiers may or may not be true soaps, and they are not skin irritants. My new cosmetic preparations include ethanolamines together with fatty acids as emulsifying agents. The ethanolamines are organic bases which are light colored, slightly viscous liquids, and are entirely miscible with water. Monoethanolamine, $NH_2(C_2H_4OH)$, boiling point 171° C. at 757 mm., diethanolamine, $NH(C_2H_4OH)_2$, boiling point 217° C. at 150 mm., triethanolamine, $N(C_2H_4OH)_3$, boiling point 277° C. at 150 mm. or the commercial mixture of these three compounds known as "Triethanolamine", and containing about 0 to 5% mono, 20% to 25% di, and 75% to 80% triethanolamine may be used. These amines combine readily with fatty acids, such as oleic, stearic, and palmitic acids, by the simple addition of the acid to the base. Liquid or semi-solid acids may be combined with the ethanolamines in the cold, but solid acids should be melted and then added to the amine.

I have discovered that a novel softening effect may be produced in cosmetics by the use of polyethylene glycol monoalkyl ethers. These compounds are non-irritating, slightly hygroscopic liquids, which are substantially colorless and which have a mild pleasant odor. A typical member of this class of compounds, and one which I prefer to use, is diethylene glycol monoethyl ether, $CH_3.CH_2.O.CH_2.CH_2.O.CH_2.CH_2.OH$, boiling at 198° C. Because of the high boiling points of these compounds, they retard the drying of the preparations in which they are used, and exert a softening and soothing effect upon the skin. This class of compounds, unlike glycerol, do not become sticky even under extreme conditions of prolonged exposure to air.

The new cosmetics are formed with ethanolamines and fatty acids as emulsifiers and with polyethylene glycol monoalkyl ethers as softening agents, and usually include additional unsaponified oleaginous material and water. The other ingredients of the various types of preparations may be chosen from those well known in the art. Fats, oils, waxes, cooling agents, emollients, medicants, water, and many other materials may be included in the compositions which may be colored and perfumed as desired. The alkyl ethers of polyethylene glycols are excellent solvents for many coloring and perfuming materials.

Examples of representative cosmetic preparations including the most common types of preparations employing emulsifying agents follow:

1. A vanishing cream was prepared as follows:

| | Parts by weight |
|---|---|
| Stearic acid | 220 |
| Lanolin (anhydrous) | 40 |
| Triethanolamine | 12.5 |
| Diethylene glycol monoethyl ether | 75 |
| Water | 500 |

The cream was prepared by melting the acid and lanoline and adding them with constant stirring to the remaining ingredients, which were heated to 95° C. An emulsion formed at once which thickened upon cooling. Efficient agitation of the mixture is essential to obtain a smooth product. The solid content, i. e. in Example 1, the lanolin and stearic acid, of a cream of this type may vary from 15% to 35% depending upon the ingredients used and the type of product desired.

2. A cleansing cream was made as follows:

| | Parts by weight |
|---|---|
| Stearic acid | 122.5 |
| Lanolin (anhydrous) | 35 |
| White mineral oil | 210 |
| Triethanolamine | 17.5 |
| Diethylene glycol monoethyl ether | 40 |
| Water | 420 |

The method of preparing this cream was the same as that employed in the previous example. A cream of this type should have a fairly high content of the ethanolamine in order to completely emulsify the oil so that it may be removed from the skin by washing with water. Various oils and waxes may be used in this type of cream, and the oil content should be fairly high.

3. An after shaving cream was made as follows:

| | Parts by weight |
|---|---|
| Stearic acid | 15 |
| Triethanolamine | 0.75 |
| Diethylene glycol monoethyl ether | 8 |
| Menthol crystals | 0.75 |
| Ethyl alcohol (anhydrous) | 0.5 |
| Water | 75 |

The cream was prepared according to the procedure given in Example 1. In general, creams of this type are similar to the vanishing creams with the addition of an emollient or a medicant, such as menthol, bay rum, witch hazel or the like.

4. The following is the formula for a latherless shaving cream:

| | Parts by weight |
|---|---|
| Stearic acid | 350 |
| Lanolin (anhydrous) | 67.5 |
| White mineral oil | 169 |
| Triethanolamine | 34 |
| Sodium tetraborate ($Na_2B_4O_7.10H_2O$) | 34 |
| Diethylene glycol monoethyl ether | 22.5 |
| Water | 1170 |

This preparation may be made by the procedure given in Example 1 and the oil may be included in the melted acid and wax mixture which is then added to the other ingredients.

The ease of preparing my new products is of major importance, while the ability of these compositions to retain large volumes of water permits their economic production.

Numerous variations of the illustrative formulae cited are possible, and will be apparent to those conversant with the art.

I claim:—

1. A cosmetic preparation containing an emulsifying agent comprising ethanolamines in conjunction with fatty acids, and a polyethylene glycol monoalkyl ether.

2. A cosmetic preparation containing an emulsifying agent comprising ethanolamines in conjunction with fatty acids, unsaponified oleaginous material, a polyethylene glycol monoalkyl ether, and water.

3. A cosmetic preparation containing an emulsifying agent comprising ethanolamines in conjunction with fatty acids, and a diethylene glycol monoalkyl ether.

4. A cosmetic preparation containing an emulsifying agent comprising ethanolamine in conjunction with stearic acid, lanolin, diethylene glycol monoethyl ether, and water.

5. An emulsified cosmetic preparation comprising the following:

| | Parts by weight |
|---|---|
| Ethanolamines | About 10 |
| Stearic acid | 50 to 200 |
| Diethylene glycol monoethyl ether | 5 to 125 |
| Unsaponified oleaginous material | 0 to 150 |
| Water | Up to 1000 |

NORMAN D. HARVEY, Jr.